US006812939B1

(12) United States Patent
Flores et al.

(10) Patent No.: US 6,812,939 B1
(45) Date of Patent: Nov. 2, 2004

(54) METHOD AND APPARATUS FOR AN EVENT BASED, SELECTABLE USE OF COLOR IN A USER INTERFACE DISPLAY

(75) Inventors: Roger Flores, Redwood City, CA (US); Bob Ebert, Montpellier (FR)

(73) Assignee: Palm Source, Inc., Sunnyvale, CA (US)

( * ) Notice: Subject to any disclaimer, the term of this patent is extended or adjusted under 35 U.S.C. 154(b) by 0 days.

(21) Appl. No.: 09/580,296

(22) Filed: May 26, 2000

(51) Int. Cl.[7] .............................. G06F 3/00; G06F 15/00
(52) U.S. Cl. ....................... 345/771; 345/772; 345/864; 345/866; 719/318
(58) Field of Search ................................. 345/156, 169, 345/530, 556, 700, 764, 765, 771, 772, 864, 866; 714/48, 49; 719/313, 315, 318; 709/310, 313, 315, 318

(56) References Cited

U.S. PATENT DOCUMENTS

| | | | |
|---|---|---|---|
| 4,521,770 A | 6/1985 | Rhyne .......................... 345/589 |
| 4,837,710 A | 6/1989 | Zelinsky et al. ............. 345/594 |
| 4,864,503 A | 9/1989 | Tolin ............................... 704/2 |
| 5,068,644 A | 11/1991 | Batson et al. ................ 345/601 |
| 5,138,305 A | 8/1992 | Tomiyasu .................... 345/3.1 |
| 5,220,503 A | 6/1993 | Suzuki et al. .................. 704/2 |
| 5,418,717 A | 5/1995 | Su et al. .......................... 704/9 |
| 5,483,631 A | 1/1996 | Nagai et al. ................. 345/736 |
| 5,515,077 A | 5/1996 | Tateyama .................... 345/593 |
| 5,552,803 A | 9/1996 | Rhodes et al. .............. 345/781 |
| 5,586,236 A | 12/1996 | Quarato ....................... 345/593 |
| 5,638,522 A * | 6/1997 | Dunsmuir et al. ........... 345/763 |
| 5,670,986 A | 9/1997 | Leak ........................... 345/6.04 |
| 5,671,378 A | 9/1997 | Acker et al. ................ 395/80.1 |
| 5,699,079 A | 12/1997 | Gossett ........................ 345/605 |
| 5,903,265 A * | 5/1999 | Bogdan ........................ 345/800 |
| 5,943,236 A * | 8/1999 | Ohno et al. .................. 700/108 |
| 5,991,711 A | 11/1999 | Seno et al. ..................... 704/3 |
| 6,011,540 A | 1/2000 | Berlin et al. ................. 345/601 |
| 6,014,133 A | 1/2000 | Yamakado et al. .......... 345/501 |
| 6,034,676 A * | 3/2000 | Egan et al. ..................... 701/29 |
| 6,049,316 A | 4/2000 | Nolan et al. ................. 345/698 |
| 6,111,572 A * | 8/2000 | Blair et al. ................... 345/703 |
| 6,115,544 A * | 9/2000 | Mueller ......................... 714/57 |
| 6,172,669 B1 | 1/2001 | Murphy et al. .............. 345/601 |
| 6,266,805 B1 * | 7/2001 | Nwana et al. ................ 717/104 |
| 6,268,852 B1 * | 7/2001 | Lindhorst et al. ............ 345/744 |
| 6,295,056 B1 | 9/2001 | Morgan et al. .............. 345/763 |
| 6,313,822 B1 | 11/2001 | McKay et al. ............... 345/698 |
| 6,314,555 B1 * | 11/2001 | Ndumu et al. ............... 717/101 |
| 6,321,188 B1 | 11/2001 | Hayashi et al. ................ 704/4 |
| 6,329,991 B1 | 12/2001 | Fukuda et al. ............... 345/629 |
| 6,345,298 B1 | 2/2002 | Moriya ......................... 709/228 |
| 6,369,840 B1 * | 4/2002 | Barnett et al. ............... 345/853 |
| 6,374,293 B1 * | 4/2002 | Dev et al. .................... 709/220 |
| 6,385,459 B1 * | 5/2002 | Lawrence et al. ........... 455/508 |
| 6,407,755 B1 | 6/2002 | Prabhu et al. ............... 345/765 |
| 6,421,571 B1 * | 7/2002 | Spriggs et al. ................ 700/17 |
| 6,433,798 B1 | 8/2002 | Smith et al. ................. 345/764 |
| 6,438,515 B1 | 8/2002 | Crawford et al. .............. 704/5 |
| 6,445,774 B1 * | 9/2002 | Kidder et al. ............... 379/9.03 |
| 6,448,958 B1 | 9/2002 | Muta ............................ 345/169 |
| 6,493,464 B1 | 12/2002 | Hawkins et al. ............. 382/189 |

OTHER PUBLICATIONS

Don Labriola, "ACD FOR THE REST OF US," Mar. 1999, Teleconnect, 17, 2, 78(.1).*

* cited by examiner

Primary Examiner—X L. Bautista
(74) Attorney, Agent, or Firm—Wagner, Murabito & Hao LLP (57) ABSTRACT

Signaling a user of a computer system that a particular event has occurred. The present invention performs this task by using a color table, which contains a list of event types and a corresponding list of display attributes. The application program signals the user that an event has occurred by displaying an event object. The application program obtains the correct display attribute for the event object by calling the color table, giving it the event type. The color table is indexed by the event type and a screen capability flag that is obtained from the operating system. The color table provides the display attribute for the specified event type based on the screen capability flag.

20 Claims, 12 Drawing Sheets

COLOR TABLE 404

DISPLAY ATTRIBUTE LISTS 450

| EVENT TYPE LIST 406 | 1 BIT DISPLAY ATTRIBUTE LIST 420 | 2 BIT GRAY-SCALE DISPLAY ATTRIBUTE LIST 422 | 4 BIT GRAY-SCALE DISPLAY ATTRIBUTE LIST 424 | 8 BIT COLOR DISPLAY ATTRIBUTE LIST 428 |
|---|---|---|---|---|
| WARNING 408 | BLACK | GRAY LEVEL 4 | GRAY LEVEL 16 | RED |
| CAUTION 410 | BLACK | GRAY LEVEL 1 | GRAY LEVEL 1 | YELLOW |
| STATUS _OK 412 | BLACK | GRAY LEVEL 2 | GRAY LEVEL 5 | GREEN |
| WIRELESS ALERT 414 | BLACK | GRAY LEVEL 4 | GRAY LEVEL 16 | RED |
| GPS POSITION 416 | BLACK | GRAY LEVEL 1 | GRAY LEVEL 3 | BLUE |
| STOCK PRICE ALERT 418 | BLACK | GRAY LEVEL 2 | GRAY LEVEL 7 | ORANGE |
| MESSAGE RECEIVED BY FAMILY 420 | BLACK | GRAY LEVEL 1 | GRAY LEVEL 2 | PURPLE |

METHOD AND APPARATUS FOR AN EVENT BASED, SELECTABLE USE OF COLOR IN A USER INTERFACE DISPLAY

BACKGROUND OF THE INVENTION

1. Field of the Invention

The present invention relates to the field of graphical user interfaces (GUIs) within computer systems. The present invention can relate to the field of palmtop computers. Specifically, the present invention discloses an efficient method and apparatus of signaling on the display screen that a particular event has occurred using pre-defined screen attributes.

2. Related Art

As the components required to build a computer system have reduced in size, new categories of computer systems have emerged. One of the new categories of computer systems is the "palmtop" computer system. A palmtop computer system is a computer that is small enough to be held in the hand of a user and can be "palm-sized." Most palmtop computer systems are used to implement various Personal Information Management (PIM) applications such as an address book, a daily organizer and electronic notepads, to name a few.

Since palmtop computer systems are very small, full-sized keyboards are generally not efficient input devices. Palmtop computers using keyboards have keyboard devices that are so small that a user cannot touch-type. Furthermore, to use a keyboard device, a user must either place the palmtop computer system down onto a flat surface, so the user can type with both hands, or the user holds the palmtop computer system with two hands and types with thumbs only.

Instead of a keyboard device, some palmtop computers utilize a touch screen and display an image of a small keyboard thereon. When a particular button is pressed or tapped, a small keyboard image is displayed on the display screen. The user then interacts with the on-screen small keyboard image to enter characters, usually one character at a time. To interact with the displayed keyboard image (e.g., "virtual keyboard"), the user taps the screen location of a character with a pen. That corresponding character is then recognized and added to a data entry field, also displayed on the screen. However, for experienced users, the virtual keyboard input system can be a tedious input process.

Instead of using a keyboard device or a displayed keyboard, many palmtop computers employ a pen and a digitizer pad as an input system. The pen and digitizer pad combination works well for palmtop computers because the arrangement allows a user to hold the palmtop computer system in one hand while writing with the pen onto the digitizer pad with the other hand.

As technology is progressing, palmtop computers are developing greater display capability, such as: monochrome; gray-scale; and color display is suggested. Within each display capability a variety of display attributes are possible. That is, each shade of gray or each unique color constitutes a distinct display attribute. Application programs utilize these display capabilities in a variety of ways, such as: rendering objects with a display attribute that will cue the user that those objects are selectable; choosing an aesthetically pleasing display; and, organizing the screen information in a more meaningful way. However, the possible display attributes for an object depends upon the display capability of each device. That is, an object can be rendered either a shade of gray or a specific color, depending on the display capability of the device. Thus, the color of the object cannot be known until the screen capability is known. Heretofore, different variations of each application program have been written to accommodate the different display types because there are a number of different display types in the consumer palmtop market. This is inefficient, and will grow more inefficient as palmtop computer displays gain more modes of display.

Signaling a computer user that a particular event has occurred is a desirable function. However, it is difficult to make different information, such as a signal, stand out on the small screen inherent to a palmtop computer. One way to differentiate objects is via color. Unfortunately, color conventions vary in different parts of the world. Furthermore, application programs are designed to run on devices with various display capabilities, as well as devices sold in various countries. Therefore, it is very difficult for the application program to handle the various display permutations. The added complexity not only adds more lines of code and manufacturing problems, but also increases the chance of program errors.

Furthermore, an individual user may wish to change the color of these event signals which appear on the display screen. For example, a certain color may have a special meaning in a given country or be more readable by a given user. Thus, it would be advantageous to provide a more efficient way to signal users of palmtop computers that a particular event has occurred.

SUMMARY OF THE INVENTION

Accordingly, what is needed is an effective mechanism and method for signaling on a display screen that a particular event type has occurred. What is further needed is a method that renders an object on the display screen in the appropriate color convention for the country the computer is sold in. What is further needed is a method which allows the user of a computer system to customize the color of the event object. What is further needed is an information display system that is very memory efficient. The present invention provides these advantages and others not specifically mentioned above but described in the sections to follow.

A method and apparatus of signaling a user of a computer system that a particular event has occurred is herein described. The present invention performs this task by using a color table, which contains a list of event types and a corresponding list of display attributes. The application program signals the user that an event has occurred by displaying an event object. The application program obtains the correct display attribute for the event object by calling the color table, giving it the event type. The color table is indexed by the event type and a screen capability flag that is obtained, in one embodiment, from the operating system. The color table provides the display attribute for the specified event type based on the screen capability flag. Advantageously, the application program does not need to know the computer's display capability or the color conventions of the country the device will be sold in. This information is stored in the color table. Furthermore, the application program needs only one piece of computer code, regardless of the number of countries the device will be sold in or the number of display capabilities which are possible. Thus, memory space in the palmtop is conserved. In another embodiment of the present invention, the application program is allowed to modify the default values of the display attributes in the color table. Thus, an application program could use its own color to display an event object if the default color is undesirable.

In one embodiment, the event type may be that an alarm from a calendar program went off, or that a pre-defined external event happened, or that a stock price hit a target price, or that an error occurred, etc. The color table contains a list of event types, such as alert, warning, caution, and status is OK; as well as a corresponding list of display attributes for each possible type of display which the device could be manufactured with. The event object, which is displayed in association with the occurrence of an event type, is an object such as a menu bar or text, but with the object displayed in a color which has special meaning. For example, an event object could be displayed in red for a warning event type if the display capability is color and dark gray for a gray-scale display. Using the color table, the application program does not need to consider the desired color for the event type. It simply requests that the operating system provide the appropriate display attribute from the color table based on a request to display the event object and given the event type.

In one embodiment of the present invention, the event object is displayed in an appropriate color for the country the computer is sold in. The color table is useful to factory preset PDA warnings using the color conventions of a particular country. For example, the color may be chosen to convey a warning message, such as a conflict in a calendar program. However, this could require different colors for different countries or regions. The present invention assigns an appropriate color to the display attributes in the color table when the computer is manufactured. Therefore, the application program does not need to have knowledge of which country the computer is being sold in or the color conventions of that country. Furthermore, the application program only needs one piece of computer code to perform this task—regardless of how many countries the device might be sold in. Thus, memory space in the palmtop is conserved.

In another embodiment of the present invention, the application program is allowed to modify the default values of the display attributes in the color table. Thus, an application program could use its own color to display an event object if the default color is undesirable. In yet another embodiment the user may select new display attributes.

In still another embodiment of the present invention, an event external to the computer triggers the process to display the event object. For example, this event type could be a stock price reaching a pre-defined value, or the computer (and thus the user) entering a certain geographic location, based on a GPS message. The event type could be reported to the computer via a modem or wireless transmission.

DETAILED DESCRIPTION OF THE INVENTION

In the following detailed description of the present invention, a method and system for providing screen display attributes based on event types, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "scrolling" or "displaying" or "recognizing" or the like, refer to the action and processes of a computer system, or similar electronic-computing device, that manipulates and transforms data represented as physical (electronic) quantities within the computer system's registers and memories into other data similarly represented as physical quantities within the computer system memories or registers or other such information storage, transmission or display devices.

Figure 1:
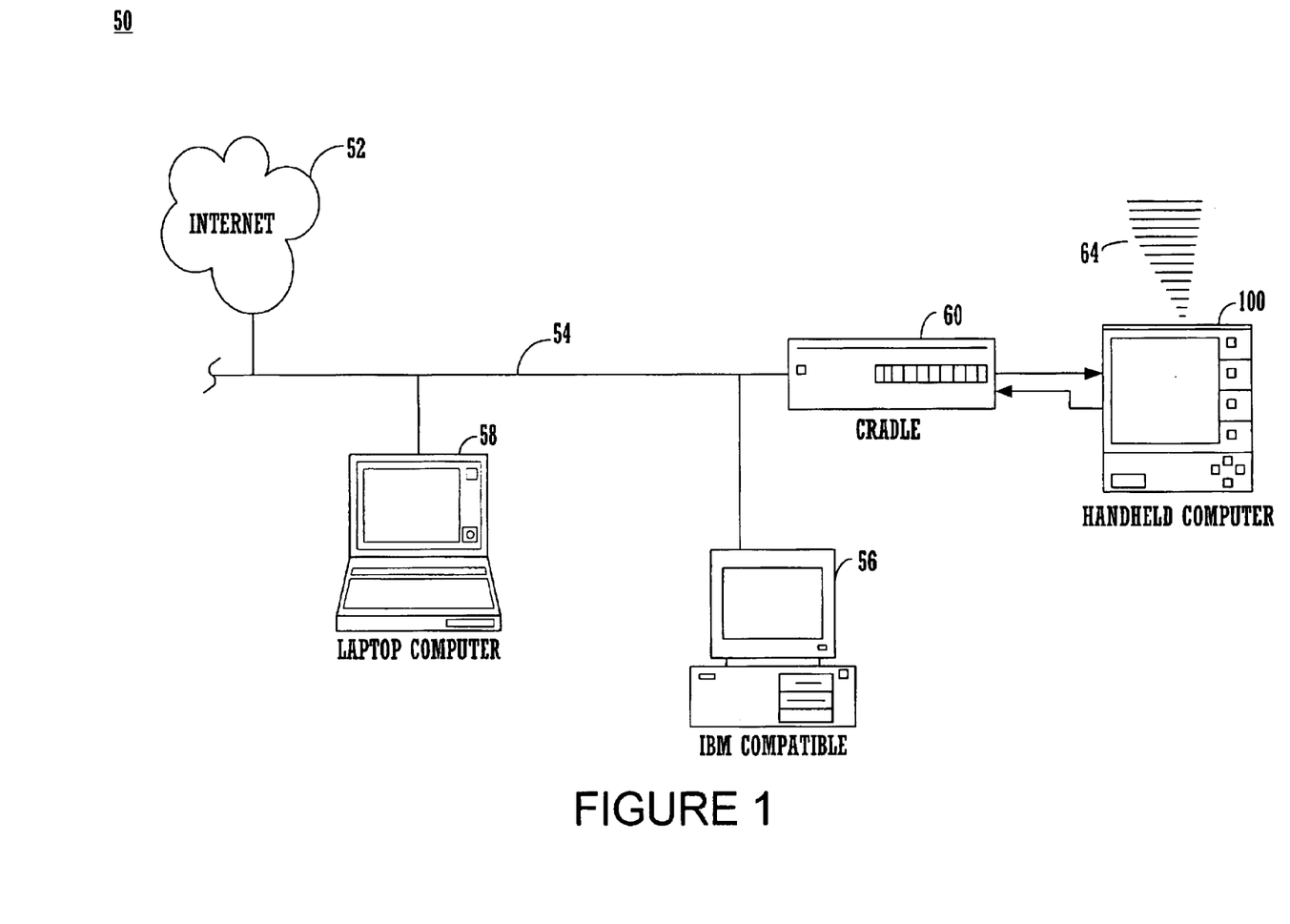
FIG. 1 is system illustration of a palmtop computer system connected to other computer systems and the Internet via a cradle device.

Method and Apparatus for an Event Based, Selectable Use of Color in a User Interface Display in Accordance with the Present Invention FIG. 1 illustrates a system 50 that can be used in conjunction with the color table scheme for displaying information based on event types, according to the present invention. System 50 comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet, Local Area Network (LAN), etc. Optionally, bus 54 can provide communication with the Internet 52 using a number of well known protocols.

Importantly, bus 54 is also coupled to a cradle 60 for receiving and initiating communication with a palm top ("palm-sized") portable computer system 100 of the present invention. Cradle 60 provides an electrical and mechanical communication interface between bus 54 (and anything coupled to bus 54) and the computer system 100 for two way communications. Computer system 100 also contains a wireless infrared communication mechanism 64 for sending and receiving information from other devices.

Figure 2A:
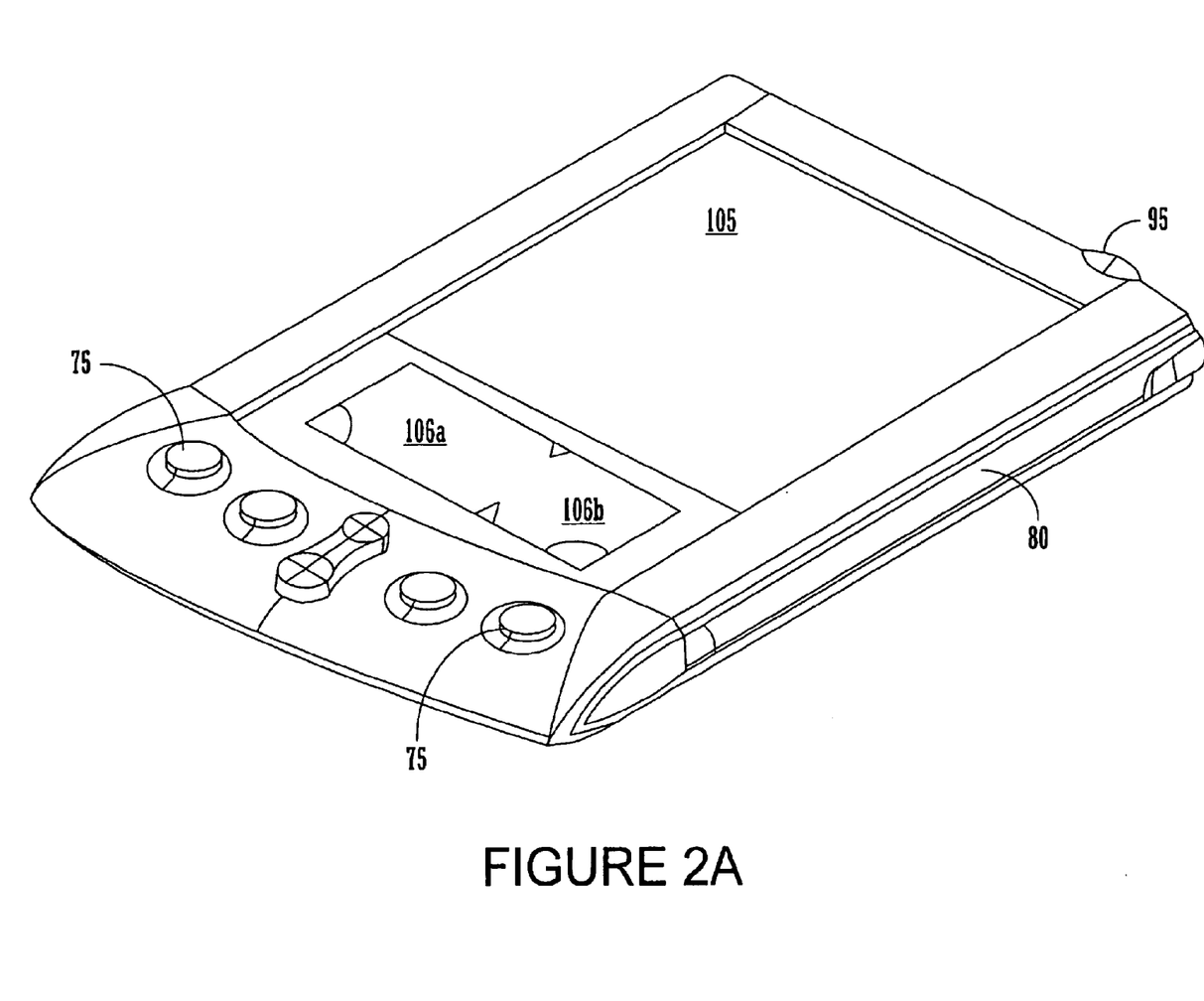
FIG. 2A is a top side perspective view of a palmtop computer system that can be used as a platform for the data entry embodiments of the present invention.

FIG. 2A is a perspective illustration of the top face 100a of one embodiment of the palmtop computer system of the present invention. The top face 110a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

Importantly, FIG. 2A also illustrates a handwriting recognition pad or "digitizer" containing two regions 106a and 106b. Region 106a is for the drawing of alpha characters therein for automatic recognition and region 106b is for the drawing of numeric characters therein for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 2B:
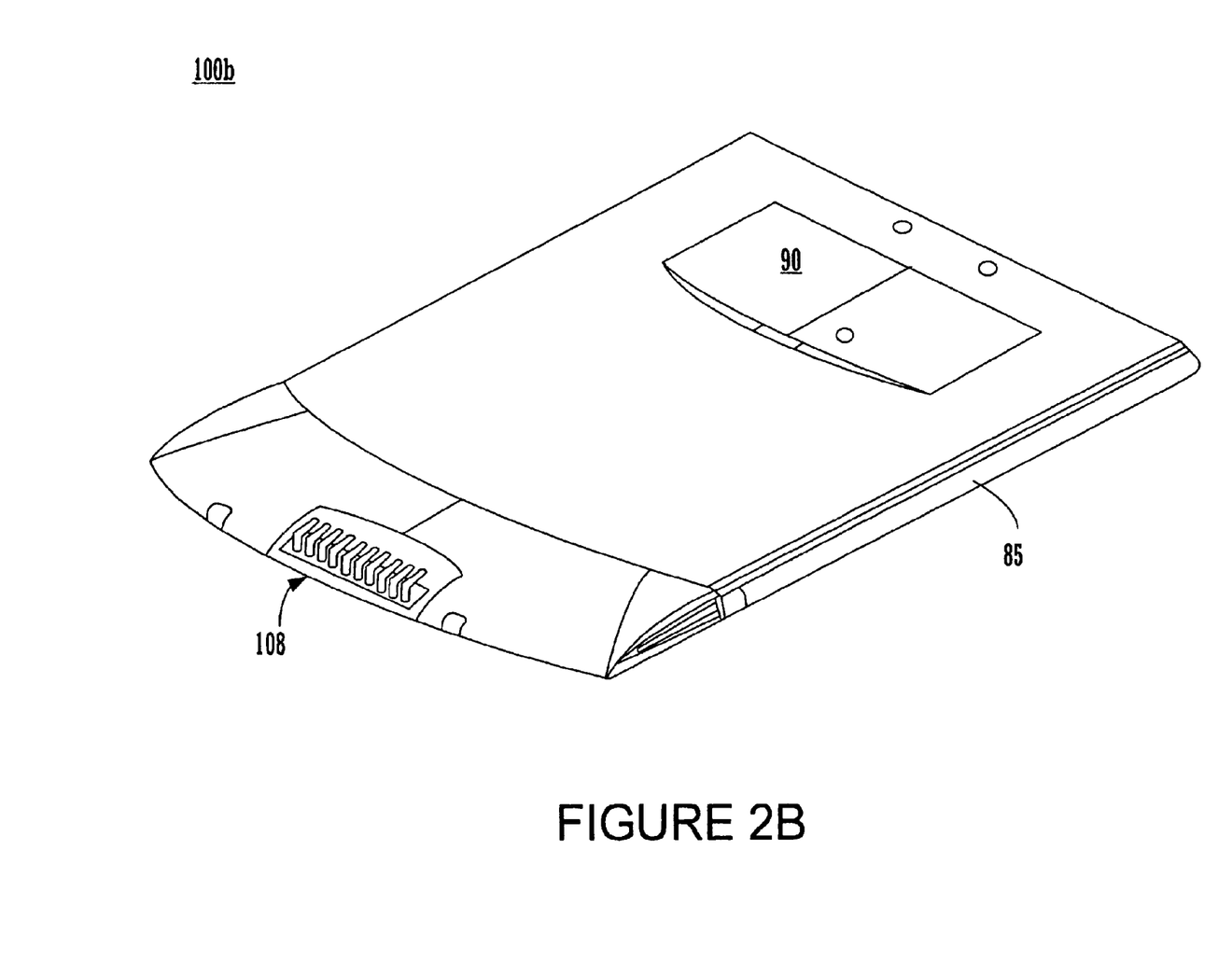
FIG. 2B is a bottom side perspective view of the palmtop computer system of FIG. 2A.

FIG. 2B illustrates the bottom side 100b of one embodiment of the palmtop computer system of the present invention. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc.

Figure 3:
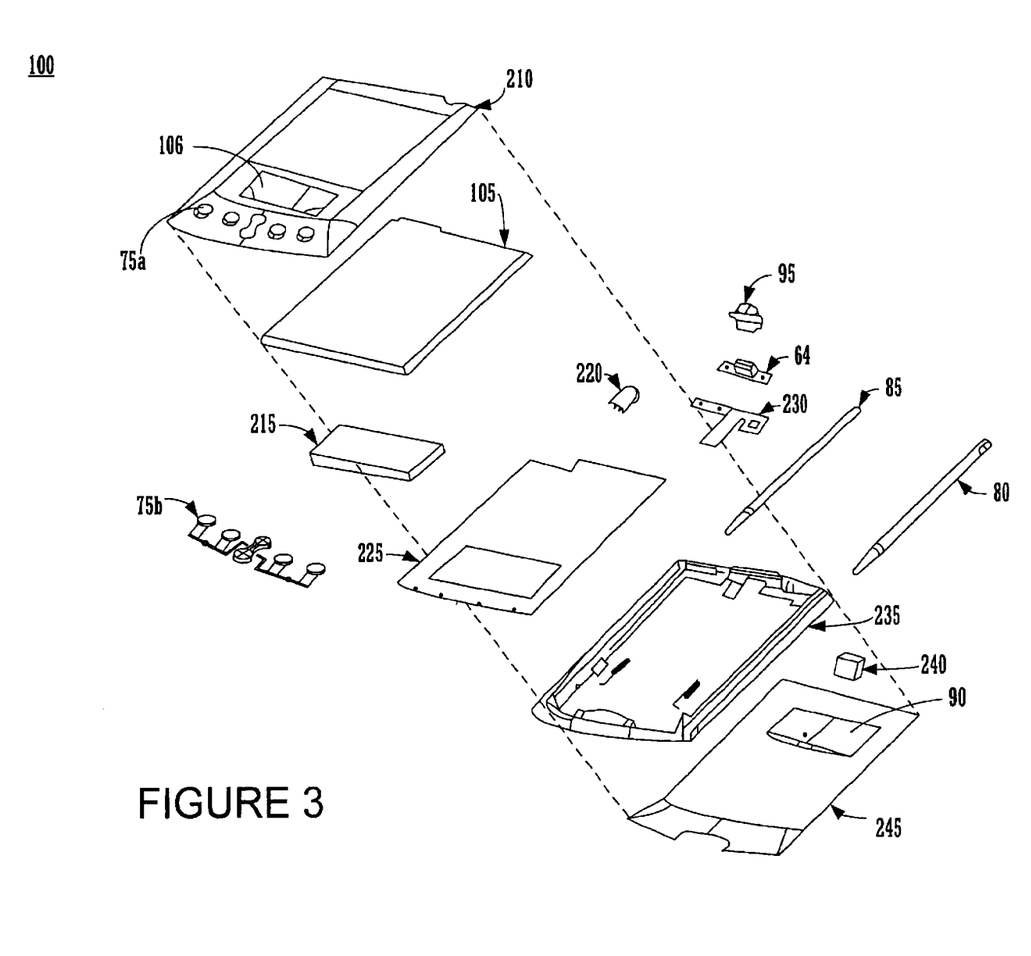
FIG. 3 is an exploded view of the components of the palmtop computer system of FIG. 2A.

FIG. 3 is an exploded view of the palmtop computer system 100 in accordance with one implementation. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., LCD, FED, plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A mid-frame 235 is shown along with stylus 80. Position adjustable antenna 85 is shown.

A radio receiver/transmitter device 240 is also shown between the mid-frame and the rear cover 245 of FIG. 3. The receiver/transmitter device 240 is coupled to the antenna 85 and also coupled to communicate with the PC board 225. In one implementation the Mobitex wireless communication system is used to provide two way communication between system 100 and other networked computers and/or the Internet via a proxy server.

Figure 4:
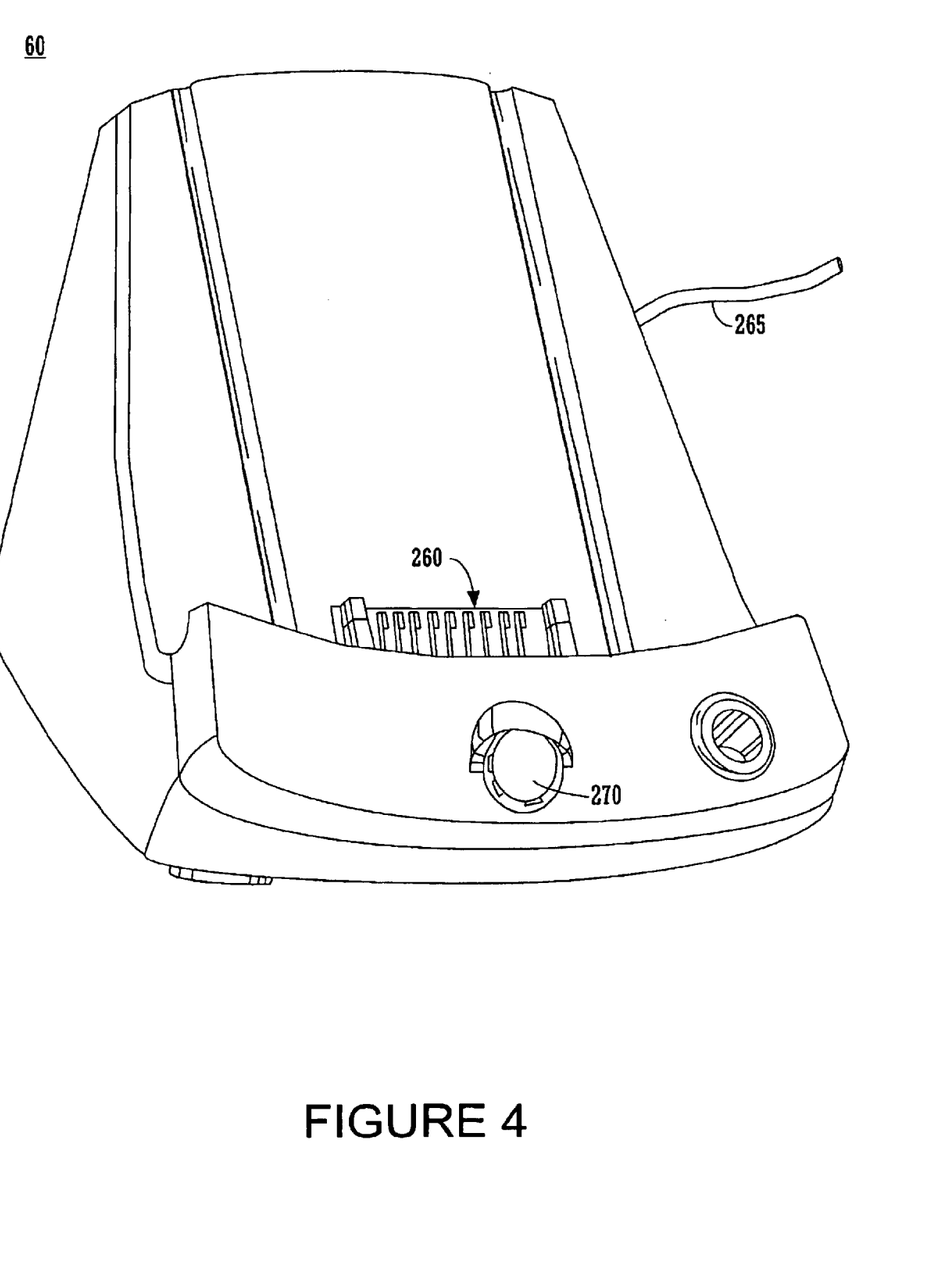
FIG. 4 is a perspective view of the cradle device for connecting the palmtop computer system to other systems via a communication interface.

FIG. 4 is a perspective illustration of one embodiment of the cradle 60 for receiving the palmtop computer system 100. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication 265.

Figure 5:
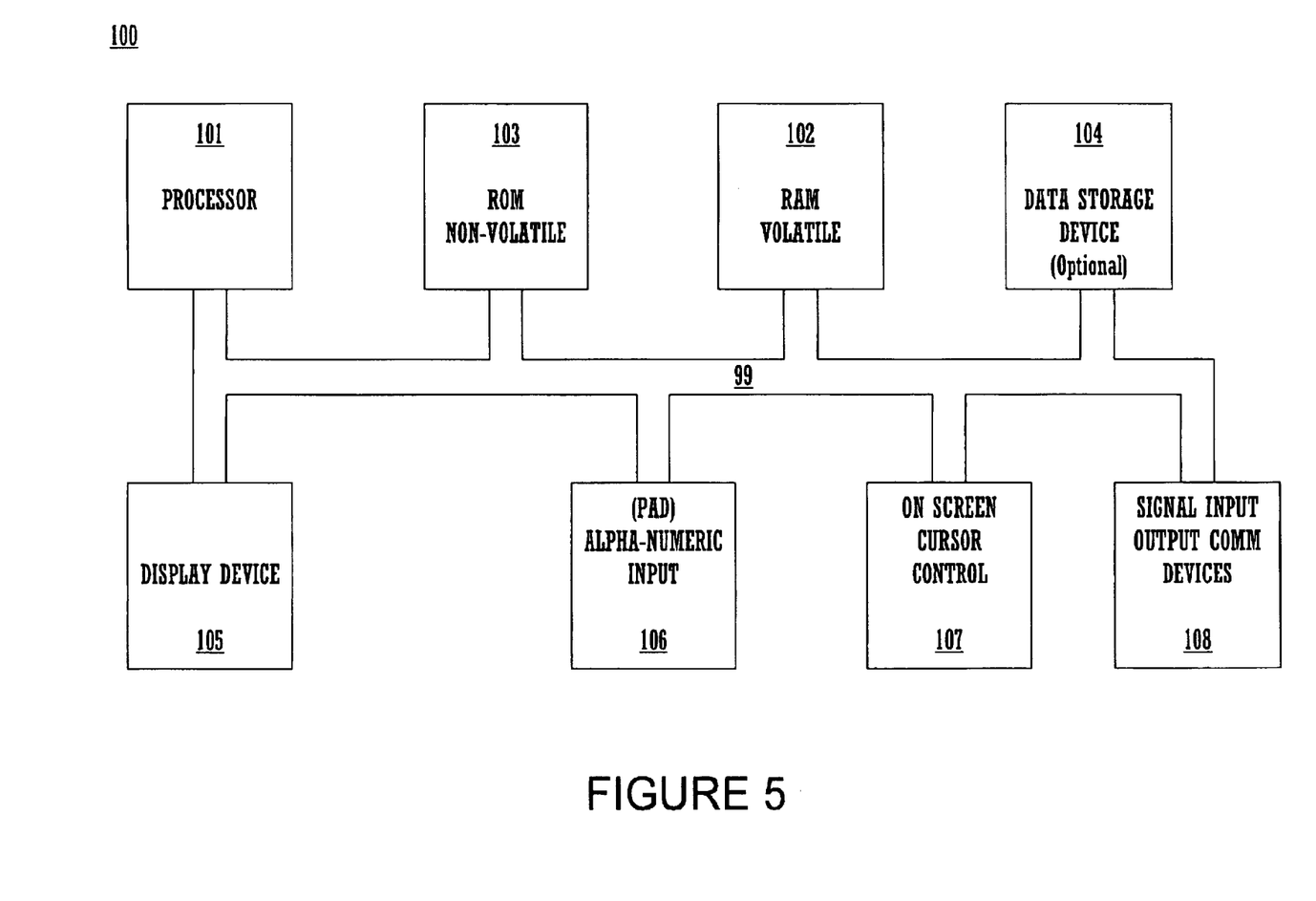
FIG. 5 is a logical block diagram of the palmtop computer system in accordance with an embodiment of the present invention.

FIG. 5 illustrates circuitry of computer system 100, some of which can be implemented on PC board 225. The computer system 100 can be used to perform color table scheme information display. Computer system 100 includes an address/data bus 99 for communicating information, a central processor 101 coupled with the bus for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 110 also includes an optional data storage device 104 (e.g., memory stick) coupled with the bus 99 for storing information and instructions. Device 104 can be removable. As described above, system 100 also contains a display device 105 coupled to the bus 99 for displaying information to the computer user. PC board 225 can contain the processor 101, the bus 99, the ROM 103 and the RAM 102.

Also included in computer system 110 of FIG. 5 is an optional alphanumeric input device 106 which in one implementation is a handwriting recognition pad ("digitizer") having regions 106a and 106b (FIG. 2A), for instance. Device 106 can communicate information and command selections to the central processor 101. System 110 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact. The display device 105 utilized with the computer system 110 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

Signal communication device 108, also coupled to bus 99, can be a serial port for communicating with the cradle 60. Device 108 can also include an infrared communication port.

Figure 6A:
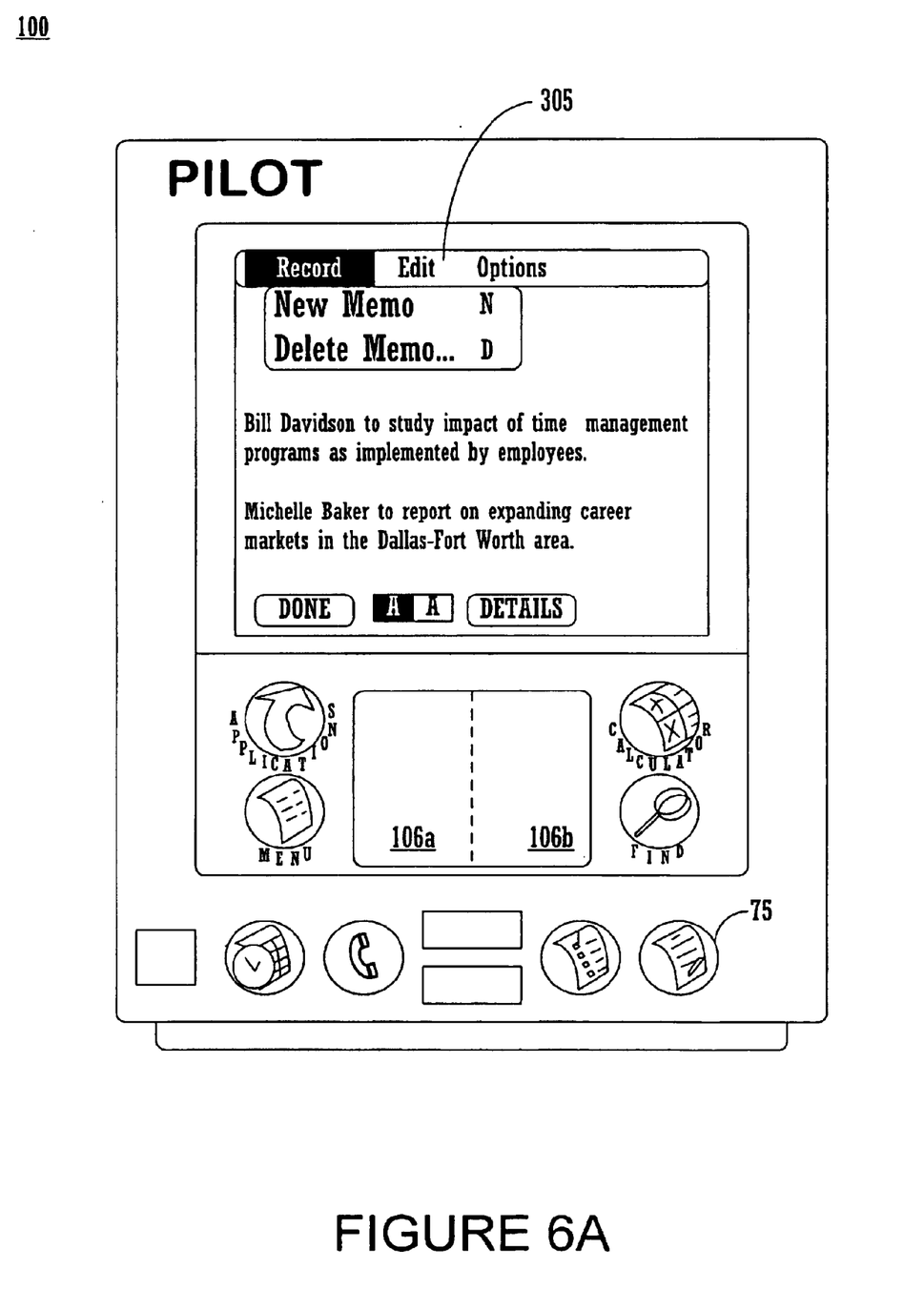
FIG. 6A is a front view of a palm top computer system illustrating the display screen, digitizer regions and an exemplary menu in accordance with the present invention.

FIG. 6A is a front view of the palmtop computer system 100 with a menu bar 305 open displaying a pull down window. Also shown are two regions of digitizer 106a and 106b. Region 106a is for receiving user stroke data for alphabet characters, and typically not numeric characters, and region 106b is for receiving user stroke data for numeric data, and typically not for alphabetic characters. Physical buttons 75 are also shown. Although different regions are shown for alphabetic and numeric characters, the present invention is also operable within a single region that recognizes both alphabetic and numeric characters.

Figure 6B:
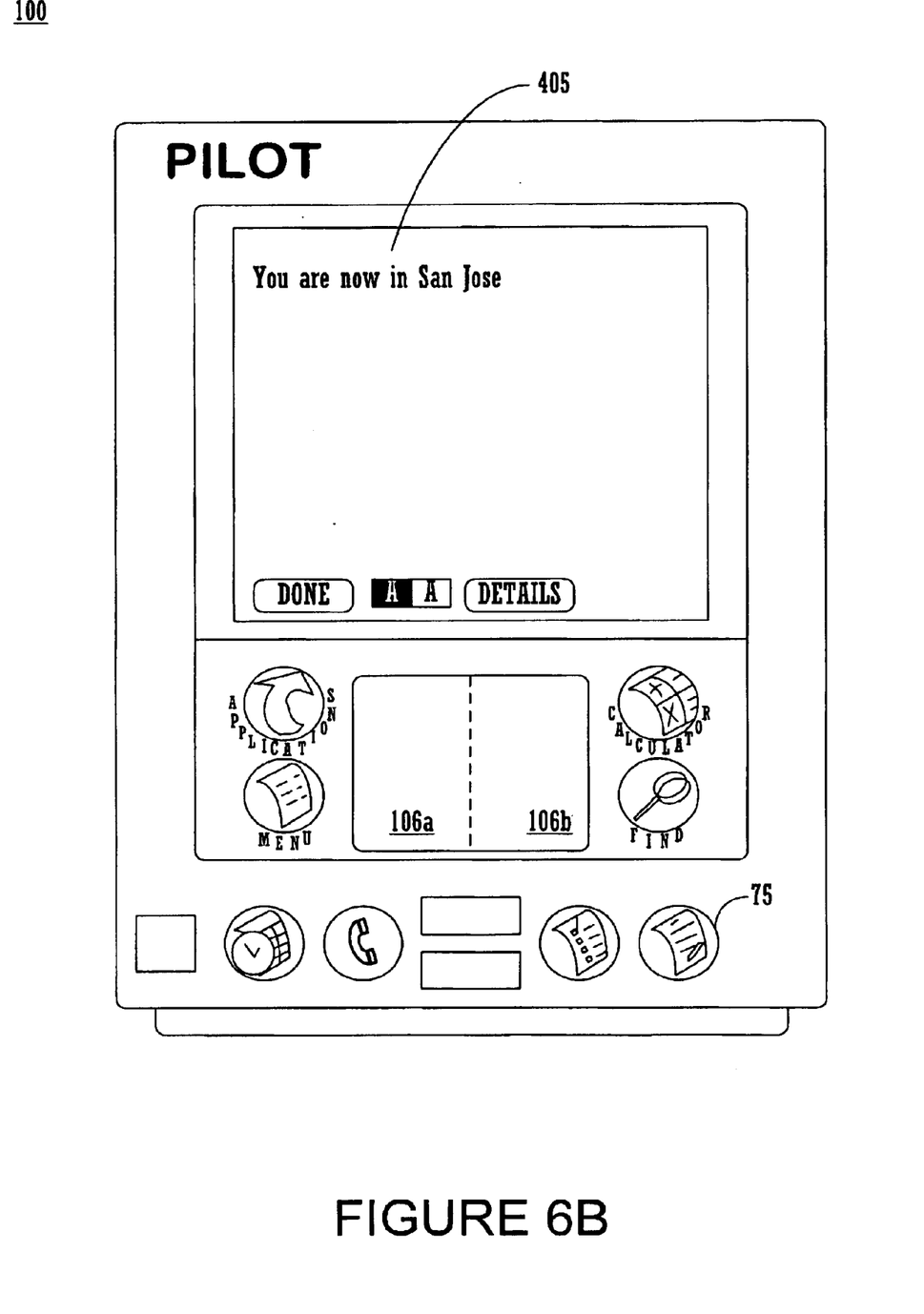
FIG. 6B is a front view of a palm top computer system illustrating an exemplary event object in accordance with the present invention.

FIG. 6B is a front view of the palmtop computer system 100 showing an event object 405, which in this case is the message, "you are now in San Jose". The event object 405 is associated with a particular event type. The event type in this case is a GPS message triggered by the user of the computer entering, for instance, San Jose. Each event type has a particular display attribute associated with it, the display attribute being a specific color or gray-scale, depending upon the display capability of the computer 100. The display capability of the computer 100 is determined by accessing a flag which is set when the computer is manufactured, by storing a value in non-volatile memory in the computer for instance. For example, if the flag indicates that the computer has a display which is capable of displaying 4 levels of gray, then the event type must be displayed in one of those gray levels, as determined by the color table. However, if the flag indicates the computer 100 was manufactured with a display 105 supporting colors, then the event type will be displayed in color, as determined by the color table. The present invention allows the application program to display event objects 405 with a display attribute specific to the event type of the event object without the application program having knowledge of the system's display capability.

Figure 7:
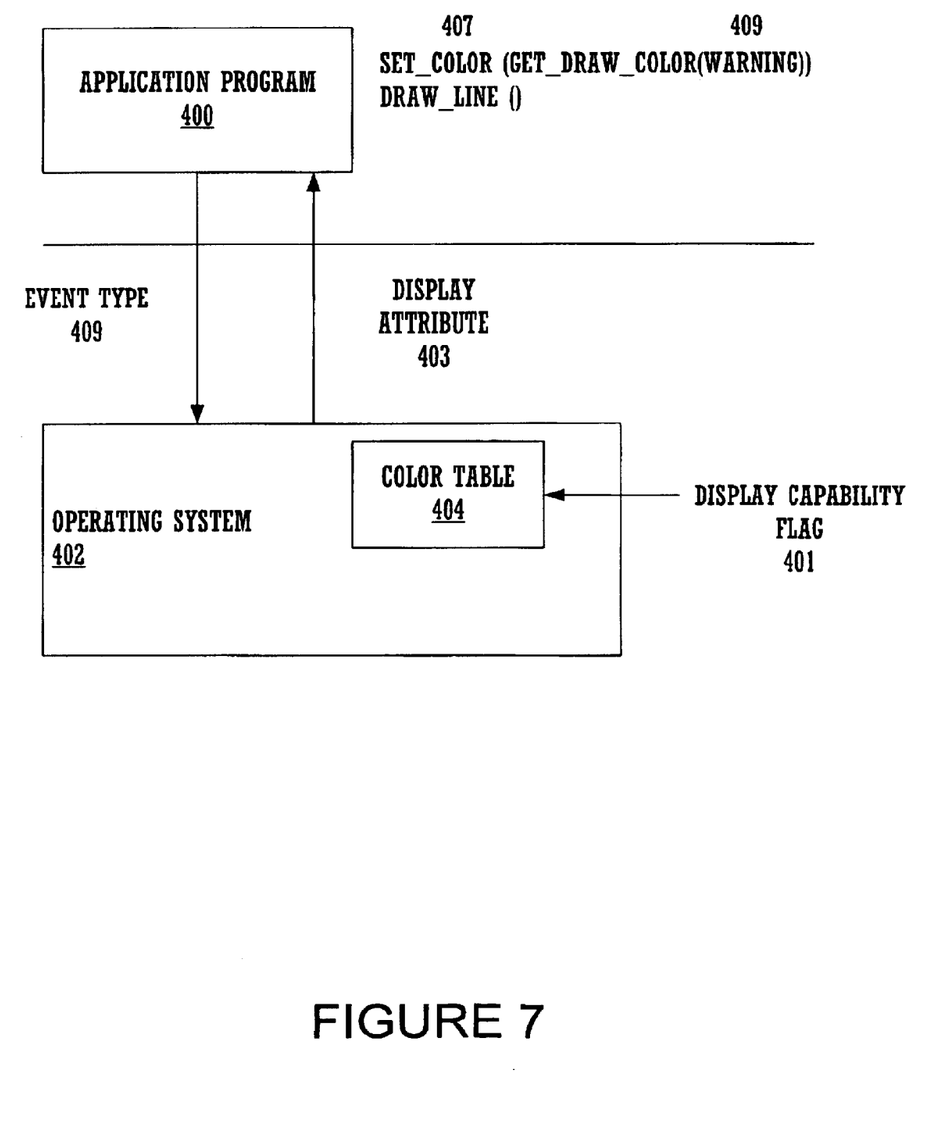
FIG. 7 is a logical block diagram showing the relationship between the application software and the palmtop's operating system, which includes the color table in accordance with an embodiment of the present invention.

FIG. 7 is a diagram showing the relationship between the application program 400 and the operating system 402 of the palmtop computer 100, which contains the color table 404. The application program 400 is universal, in that it does not need to have any information as to the display capability of display 105. FIG. 7 shows exemplary subroutines 407: SET_COLOR and DRAW_LINE, which the application program 400 uses to assist in rendering objects 405 on the display 105. The subroutine DRAW_COLOR, having the event type 409, warning, is used to obtain the correct display attribute for an event object 405. The application program 400 makes a call to the operating system 402, which has a color table 404 and access to a display capability flag 401. The display capability flag reflects the type of display screen 105 that is installed in computer system 100. Based on the display capability flag 401, the operating system 402 returns to the application program 400 the appropriate display attribute 403 for the event object 405 to be displayed. Thus, the application program 400 does not need to know the display capability. This greatly simplifies the application programmer's task, and different applications do not have to be written for each possible display capability. Additionally, the application program 400 only needs one piece of code for this operation. Thus, memory space in the palmtop is conserved.

Figure 8:
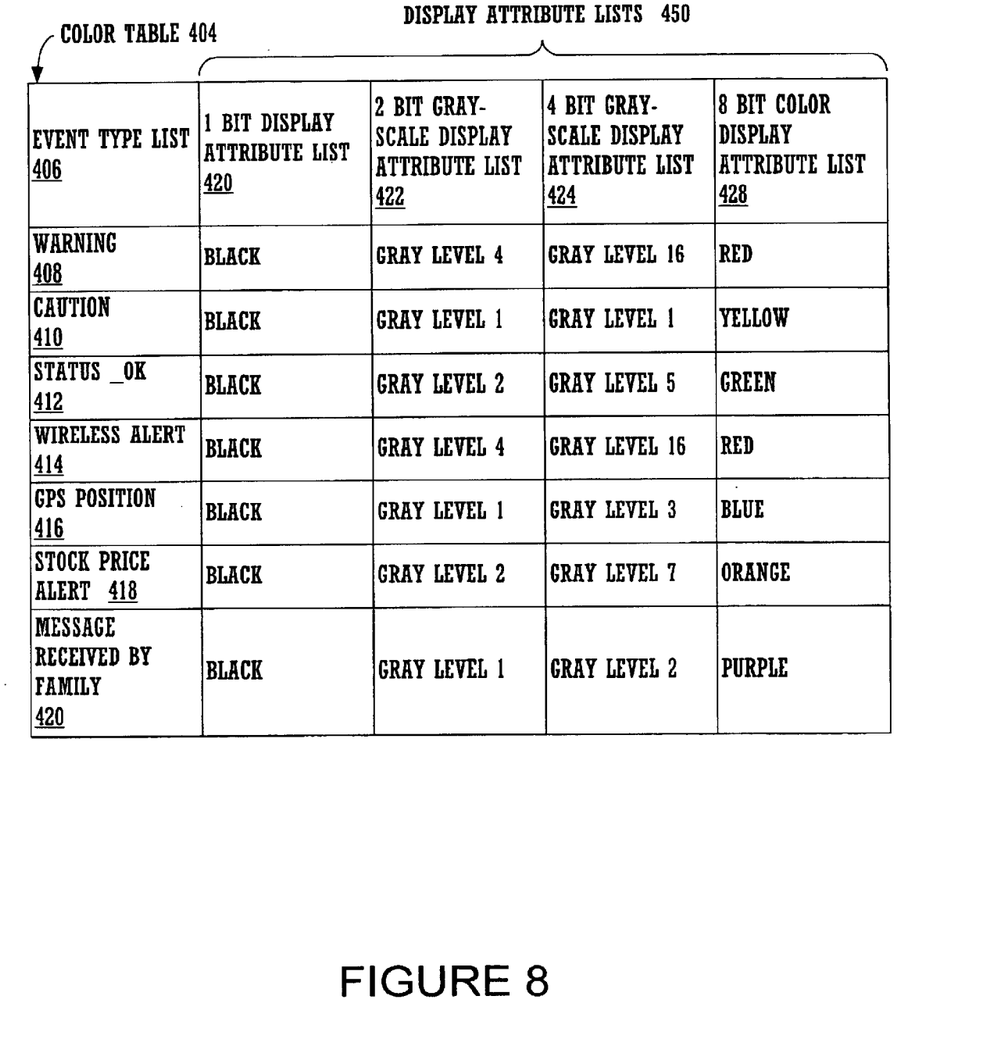
FIG. 8 is a color table used by the operating system to decide what color (or gray-scale) for an event object to be displayed with on the palmtop display based on a user event.

FIG. 8 shows a color table 404 which is used by operating system 402 to determine the appropriate display attribute 403 for an event object 405 to be rendered. The display attribute 403 is based on the event type 409 of the event object 405 to be rendered. The color table 404 comprises an event type list 406, including event types 409, such as warning 408, caution 410, status_OK 412, wireless alert 414, GPS position 416, stock price alert 418, and message received by family 420. The table also has display attribute lists 450. The various display attribute lists 450 shown in table 404 are: 1-bit or monochrome display attribute list 420, 2-bit gray display attribute list 422, 4-bit gray display attribute list 424, and 8-bit color display attribute list 426. There is one display attribute list for each possible screen display capability that computer system 100 could be manufactured with. Thus, the display attribute list for 4-bit gray-scale includes 16 shades of gray and for 8-bit color includes up to 256 unique colors.

While the table 404 shows the display attribute 403 for warning as being red for a color display, the color is set when the computer 100 is manufactured to be appropriate for the country that the computer 100 will be sold in. When the application program 400 calls the color table 404 to obtain the appropriate display attribute 403 and then renders the event object 405, the appropriate color is thus rendered for the given screen capability without the application program 400 having knowledge of the color conventions for a given country.

Figure 9:
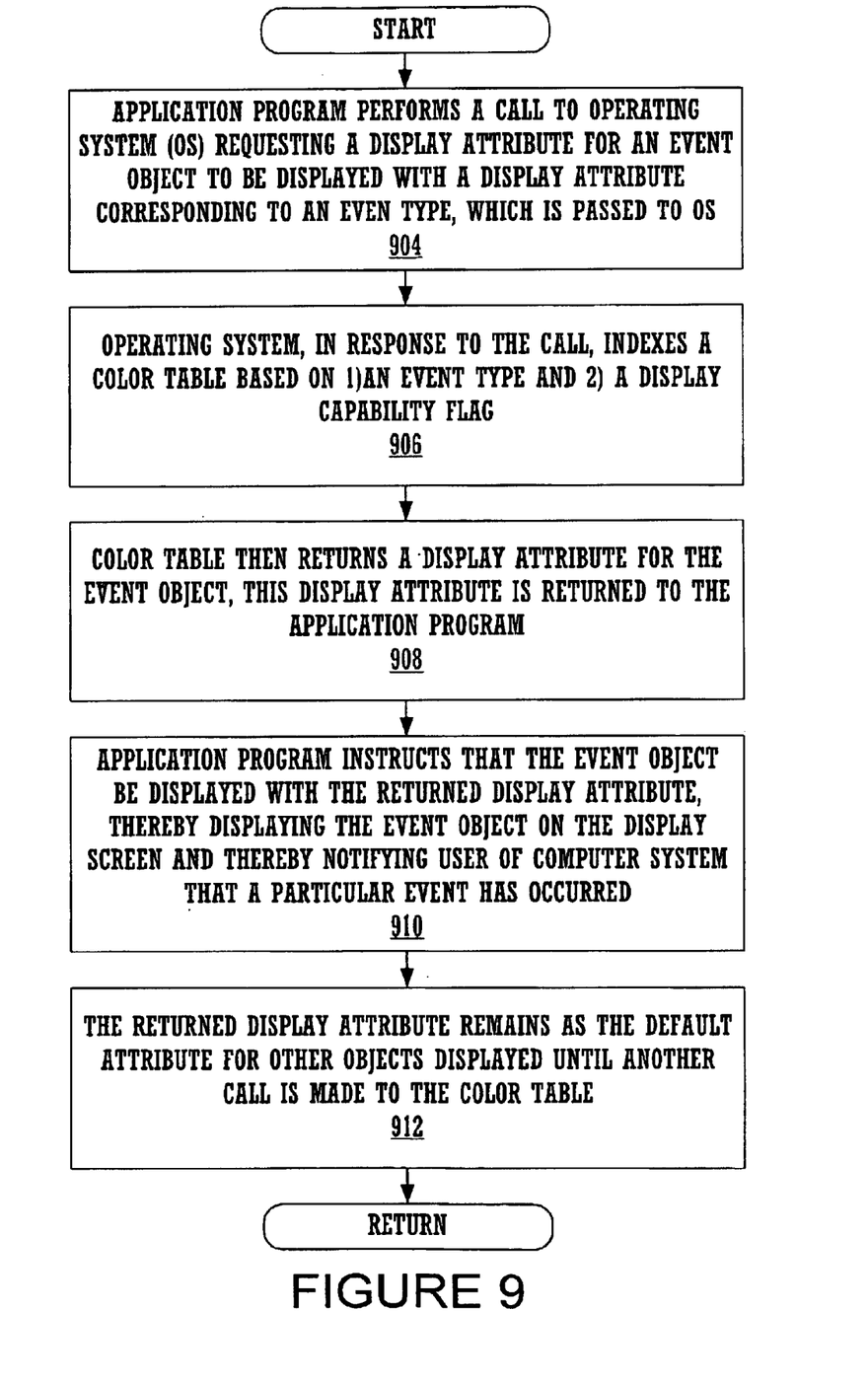
FIG. 9 illustrates a flowchart of the steps of an embodiment of the present invention for determining which color to display an event object, based on a defined event type.

FIG. 9 is a flowchart showing the process of rendering an event object 405 on the display 105 in the appropriate color in accordance with one embodiment of the present invention. In step 904, the application program 400 requests a display attribute 403 for an event object 405, passing an event type 409 to the operating system 402. In step 906, the operating system 402 indexes a color table 404 with the event type and a display capability flag. The table 404 contains the appropriate display attribute 403 for the event type 409. Thus, the operating system 402 is then able, in step 908, to return the display attribute 403 to the application program 400. In step 910, the application program 400 displays the event object 405 with the correct display attribute 403 for the given event type on the display screen 105. Thereby, the user of the computer is notified that a particular event has occurred. In step 912, the returned display attribute 403 remains as the display attribute 403 for all other event objects 405 until another call is made to the operating system 402 to access the color table 404.

Another embodiment of the present invention allows the user to change the display attributes 403 associated with event types. This can be accomplished by displaying the color table 404, along with a color palette menu on the display screen 105. The user could touch the current display attribute for the event type 409 and then the desired color on the palette with stylus 80. However, those of ordinary skill in the art will recognize that there are numerous other ways for the user to choose a new display attribute 403 for event types 409. In another embodiment, the user need only set the new display attribute 403 once, and all application programs 400 will render event objects 405 in this new user defined display attribute 403 for the event type 409.

Figure 10:
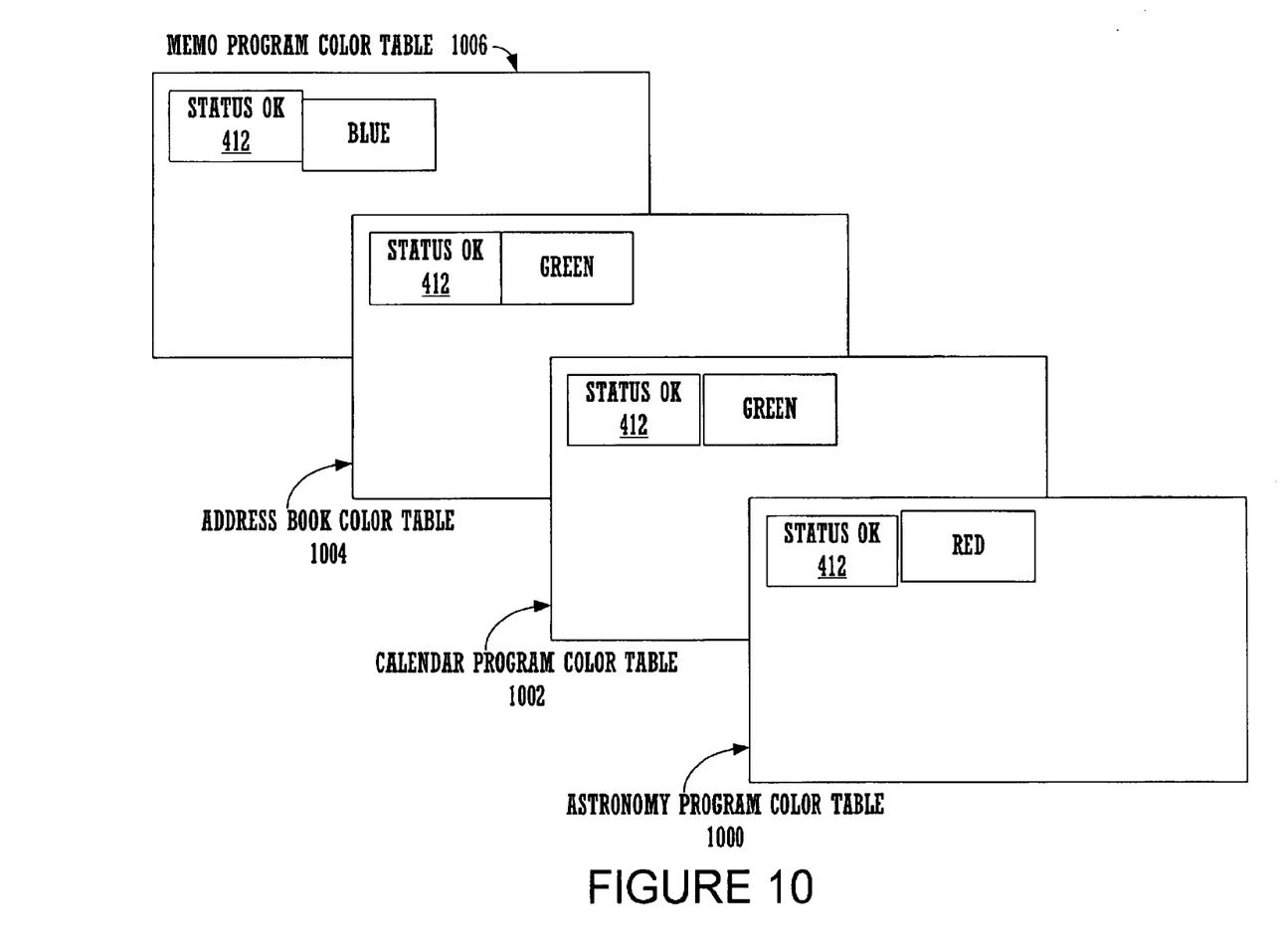
FIG. 10 shows a number of color tables used by the operating system to decide what color (or gray-scale) that an event object should be rendered in based on an event type and display capability in accordance with an embodiment of the present invention.

However, the user defined display attributes 403 do not have to affect all programs 400. Thus, the present invention allows the user to effectively have multiple color tables 404. FIG. 10 is a diagram reflecting the multiple color tables 404 that the user may have. For example, the user could have different colors for event types 409 in different programs. Thus event type 409 status_OK 412 is red for an astronomy program color table 1000, green for a calendar program color table 1002, green for an address book color table 1004, and blue for a memo program color table 1006.

In another embodiment of the present invention, the process of displaying the event object 405 may be triggered by an event external to the palmtop computer 100. For example, the trigger event may be a stock price reaching a predetermined amount; or in a GPS based usage, that the user (i.e., the computer 100) is in a certain geographic location. This could be reported to the palmtop though a modem or wireless transmission via the receiver/transmitter device 240 and antenna 85.

The preferred embodiment of the present invention, a method and system for signaling on a display screen that a particular event type has occurred, is thus described. While the present invention has been described in particular embodiments, it should be appreciated that the present invention should not be construed as limited by such embodiments, but rather construed according to the below claims.

What is claimed is:

1. In a computer system, a method of signaling that an event has occurred, comprising the steps of:
   a) an application program of said computer system making a call to request a display attribute for an event object to be displayed on a display screen, said call including an event type corresponding to said event object;
   b) in response to said request, indexing a table with said event type and a screen capability flag to obtain said display attribute, wherein said table is located externally of said application program and has an event type list having a plurality of event types that are different from one another and a plurality of display attribute lists, each of said display attribute lists having a display attribute corresponding to each of said plurality of event types in the event type list, and each of the display attribute lists corresponding to a different potential display capability; and,
   c) said application program displaying said event object on said display screen with said display attribute, wherein a user of said computer system is signaled that an event has occurred.

2. The method of claim 1, further comprising the step of:
   setting at least one display attribute in said table such that said display attribute conveys a particular meaning to the user of the computer system.

3. The method of claim 2 wherein said at least one display attribute is a color.

4. The method of claim 2 wherein said meaning to the user is warning.

5. The method of claim 2 wherein the meaning to the user is caution.

6. The method of claim 2 wherein the meaning to the user is status is good.

7. The method of claim 1 further comprising the step of said application program changing at least one of said display attributes.

8. The method of claim 1 further comprising the step of a user of said computer system changing at least one of said display attributes.

9. The method of claim 1 wherein said table resides in an operating system of said computer system.

10. The method of claim 1 further comprising the step of:
    accessing said screen capability flag from an operating system.

11. The method of claim 1 wherein said computer system is a palmtop computer system.

12. A computer system comprising:
    a processor coupled to a bus;
    a display screen coupled to said bus;
    a memory unit coupled to said bus and comprising instructions that when executed by said processor implement a method of signaling that an event has occurred, comprising the steps of:
    a) an application program of said computer system making a call to request a display attribute for an event object to be displayed on a display screen, said call including an event type corresponding to said event object;
    b) in response to said request, indexing a table with said event type and a screen capability flag to obtain said display attribute, wherein said table is located externally of said application program and has an event type list having a plurality of event types and a plurality of display attribute lists, each of said display attribute lists having a display attribute corresponding to each of said plurality of event types in the event type list, and each of the display attribute lists corresponding to a different potential display capability of the display screen; and,
    c) said application program displaying said event object on said display screen with said display attribute, wherein a user of said computer system is signaled that an event has occurred.

13. A computer system as described in claim 12 wherein said computer system is a portable computer system.

14. A computer system as described in claim 12 wherein said computer system is a palm-sized computer system.

15. In a palm-top computer system, a method of displaying information, comprising the steps of:
    a) an application program of said computer system making a call to request a display attribute for an event object to be displayed on a display screen, said call including an event type corresponding to said event object;
    b) in response to said request, indexing a table with said event type and a screen capability flag to obtain said display attribute, wherein said table is located externally of said application program and has an event type list having a plurality of event types that are different from one another and a plurality of display attribute lists, each of said display attribute lists having a display attribute corresponding to each of said plurality of event types in the event type list; and,
    c) said application program displaying said event object on said display screen with said display attribute, wherein a user of said computer system is signaled that an event has occurred.

16. The method of claim 15, further comprising the step of:
    setting at least one display attribute in said table such that said display attribute conveys a particular meaning to the user of the computer system.

17. The method of claim 16 wherein said display attribute is a color.

18. The method of claim 15 wherein step a) comprises the step of:
    a1) an event external to said palm-top computer system triggering said call by said application program to request said display attribute for said event object.

19. The method of claim 18 wherein:
    said event external to said palm-top computer system is a stock price reaching a pre-defined price.

20. The method of claim 18 wherein:
    said event external to said palm-top computer system is the computer entering a certain geographic location.

* * * * *